United States Patent

[11] 3,601,453

| [72] | Inventor | Seymour Silverman<br>5070 N. Bay Road, Miami Beach, Fla. 33141 |
|---|---|---|
| [21] | Appl. No. | 838,252 |
| [22] | Filed | July 1, 1969 |
| [45] | Patented | Aug. 24, 1971 |

[54] SAFETY LOCK FOR TRAILER DOORS
5 Claims, 3 Drawing Figs.

[52] U.S. Cl. .................................................. 303/89,
303/6.1, 292/144, 292/DIG. 32
[51] Int. Cl. ........................................................ B62d 53/06,
B60t 13/24, E03b 51/02
[50] Field of Search ........................................... 292/144;
280/420, 421, 422; 180/112; 303/29; 70/275;
303/89, 6.1

[56] References Cited
UNITED STATES PATENTS

| 938,487 | 11/1909 | Hofstatter ..................... | 70/275 |
| 1,037,502 | 9/1912 | Lowell .......................... | 292/144 |
| 1,245,049 | 10/1917 | Silverstein .................... | 292/145 |
| 1,797,384 | 3/1931 | Ward et al. ................... | 70/275 X |
| 2,530,628 | 11/1950 | Pivero .......................... | 292/144 X |

*Primary Examiner*—Albert G. Craig, Jr.
*Attorney*—Spector & Alster

ABSTRACT: A lock for the door of a trailer to inhibit pilfering from an unattended trailer, as when one is in "piggyback" transit by rail or when it is in a yard unattended by a tractor operator without an attached tractor. A power lock for the door is mounted in a position inaccessible from the outside of the trailer and for its operation requires power such as air pressure or 12-volt electricity, which is available from a tractor, to unlock it.

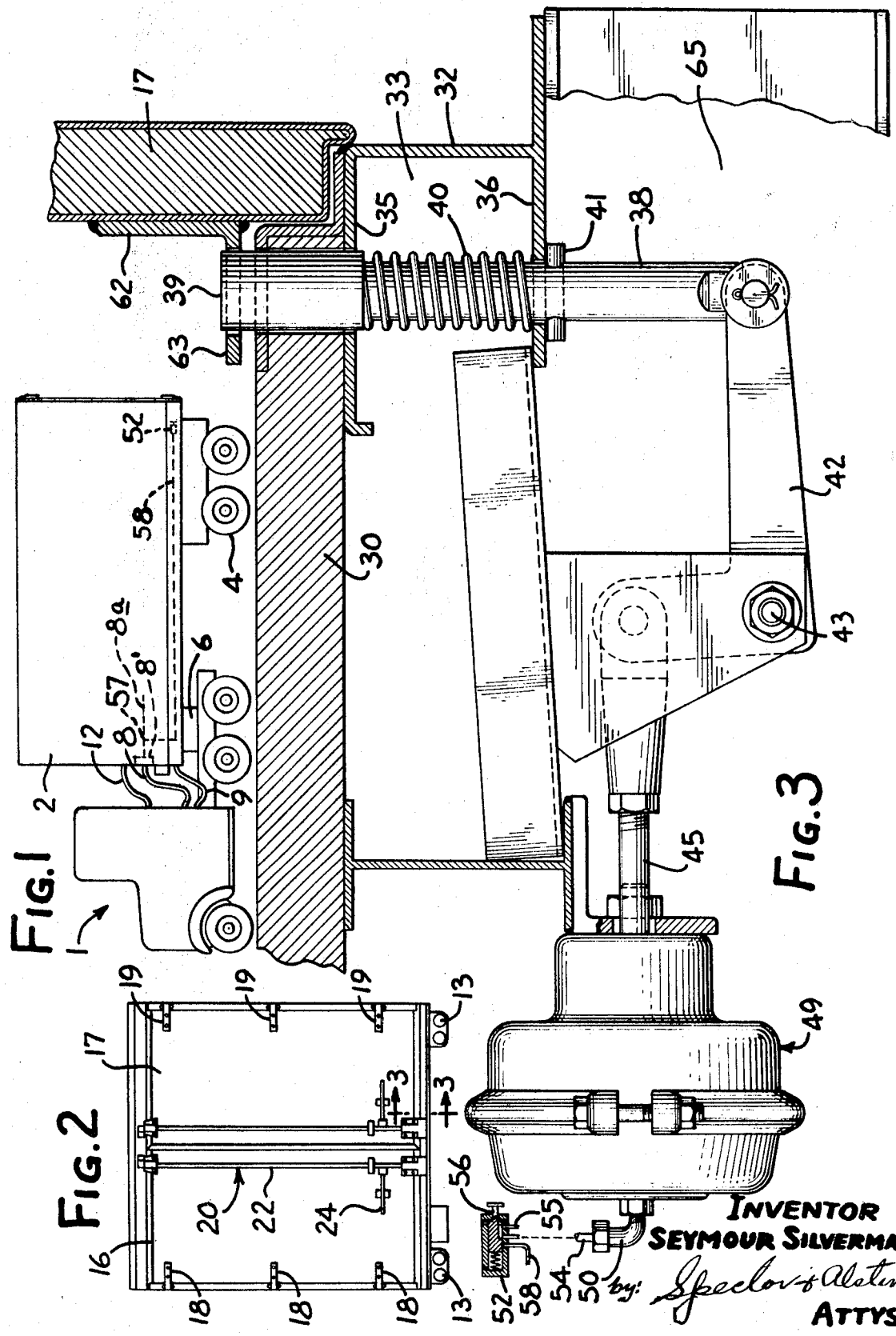

SAFETY LOCK FOR TRAILER DOORS

This invention relates to apparatus for controlling the opening of the door to a motor trailer, or the like. The word "trailer" is used to include a semitrailer.

Truck trailers are frequently burglarized by entry gained through breaking of the usual door locks. This is particularly true when the trailer itself is or has just been transported on a railroad freight car. A trailer on a freight car is subject to pilfering, and it is also subject to pilfering while it is in the freight yard after removal from the railroad freight car.

A tractor for transporting the trailer provides two sources of auxiliary power for use incidental to the transportation of the trailer. One source of power is air pressure for operating the trailer brakes. The other is electricity for operating the trailer safety signal lighting equipment. It is an object of this invention to provide a simple trailer-door-locking arrangement that requires for its operation either or both of the two outside sources of power that a trailer normally receives from its tractor when it is coupled thereto. In the preferred embodiment of the invention, power from the outside source is required to move the locking mechanism to its released position, and it cannot be moved to that position in the absence of that power.

The attainment of the above and further objects of this invention will be apparent from the following description taken in conjunction with the accompanying drawing forming a part thereof.

In the drawing:

FIG. 1 is a side view of one conventional type of tractor and its trailer to which the present invention is applied;

FIG. 2 is a rear view of the door of the trailer of FIG. 1; and

FIG. 3 is an enlarged sectional view taken along the line 3—3 of FIG. 2 and showing the locking mechanism.

Reference may now be had particularly to the drawing illustrating a preferred embodiment of the invention.

In the drawing, a conventional six-wheel motor tractor is indicated at 1, to which is coupled a container or semitrailer 2 by means of a conventional coupler 6 that permits coupling and uncoupling of the tractor from the trailer.

The trailer 2 has a four-wheel truck 4 which has a usual pneumatic braking system that is controlled from the cab of the tractor 1 in the usual manner through releasably coupling air hoses 8 and 9, of which 8 is the service line and 9 is the emergency line. These lines lead compressed air through releasable couplings, one of which is shown at 8', to the usual equipment for controlling the application and release of the air brakes of the wheels of the truck 4. An additional releasable coupling cable 12 provides a multiwire electrical connection between the tractor and the trailer, whereby the electrical system of the tractor applies voltage, in the usual case 12 volts direct current, to the trailer for controlling from the tractor the one and off condition of the usual signal and safety lights such as 13—13 which are the direction and stop lights of the trailer, and the clearance lights.

The rear of the trailer has doors 16–17 that are hinged at 18 and 19, respectively, for swinging about vertical axes in a doorframe. The door 16 is closed first and the door 17 which is closed thereafter overlaps the edge of the door 16 and holds that door against opening until the door 17 has been opened. Each door has a conventional camming arrangement for forcing the door to its fully closed position and latching it in that position, preferably in a manner to prevent racking. This occurs at many times, for instance during humping of a railroad freight car on which the trailer may be carried piggyback. The door-latching structure is generally indicated at 20 and includes an axially rotatable vertical bar 22 suitably journaled on the door and having a handle 24 secured thereto and carrying upper and lower cams that cooperate with keepers mounted on the upper and lower portions of the doorframe of the trailer. The latching structure on the door 17 is the same as that on the door 16 except that the cams at the upper and lower ends of the respective bars 22 of the doors are respectively right- and left-hand cams. When the door is being closed, the cams at the upper and lower ends of the bars 22 force the respective doors firmly into the doorframe of the trailer. This antiracking door-latching structure is illustrated more fully in U.S. Pat. No. 3,160,433 that issued Dec. 8, 1964 to which reference may be had for a more complete description.

In FIG. 3 there is shown at 30 the rear portion of the floor of the trailer, by the door 17 being locked closed. At its rear the floor is supported by rear steel crossmember 32 which has a rearwardly facing channel 33 defined by upper and lower flanges 35 and 36. An air-pressure-operated locking mechanism is mounted below the floor, said mechanism, including a vertically moving locking plunger 38 the top 39 of which in its extended position is a short distance above the floor. The upward movement is caused by a spring 48 and is limited by a pin 41. The plunger is movable to its retracted or unlocked position by a crank 42 pivoted at 43 and actuated by a plunger 45 of a diaphragm-type air motor 49 that receives air from an air-inlet coupling 50 that is controlled by a manually operable pneumatic switch comprising a valve 52. The valve 52 is spring biased to its off position illustrated in FIG. 3 where it connects the airline 54 to atmosphere at 55. When the valve 52 is moved to its alternate position by pushing on the knob 56, it connects the line 54 to a pipe 58 that is connected at 57 to the brake air-pressure service line 8. The point 57 is between the coupling 8' and the airline 8a that leads to the air service side of the braking system. The trailer coupling 8' is open to atmosphere when the trailer is disconnected from the tractor, so that at that time the line 58 is also at atmospheric pressure.

A hasp 62 in the form of an angle member is welded to the inside of the door and in the door-closed position a circular hole 63 therein is aligned to receive the top of the locking bolt 38, thus locking the doors of the trailer. To open the doors, it is necessary to apply air pressure via the line 8 to the service line of the trailer. At that time, manual movement of the knob 56 to its release position causes the air pressure to actuate the air motor 49 to move the crank 42 clockwise, retracting the lock 38. In its retracted position, the top of the lock 38 is flush with the top of the floor 30 permitting the opening of the doors of the trailer in the customary manner.

As previously stated, the valve 52 is manually operable and is located on the trailer in any convenient inconspicuous location accessible to an operator externally of the trailer. Operation of the valve 52 at a time when there is no air pressure on the line is of no effect.

If desired, the valve 52 may be located in an inaccessible location and an electromagnetic operator provided for it, in which event an electric pushbutton switch would be placed on the outside of the trailer in a conveniently accessible place, namely for instance the place indicated at 52 in FIG. 1, to actuate the pneumatic valve. Such operation would derive its power via the electric line 12 which receives its electric power from the tractor. It is thus apparent that in such an arrangement in the absence of a tractor the pilferer would require not only air pressure but also a source of 12-volt direct current, neither of which is generally available to the usual pilferer.

In order to prevent a pilferer from actuating the locking plunger 38 manually, the portion of the locking structure below the flange 36, that includes the plunger 38, crank 42, plunger 45 and preferably also the motor 49, are all enclosed in a steel housing 65 that cannot be opened except by the use of special tools that are generally not accessible to pilferers. For instance, the housing may be bolted closed and the nuts welded to the body of the enclosure so that removal is possible only by first cutting away the nuts or the welded portions thereof with a welding torch.

At times it may be undesirable to have an arrangement wherein the locking bolt 40 projects upwardly from the floor of the trailer during the time that the door is open. When that is the case, the entire locking mechanism may be mounted to extend downwardly from the top or inside roof surface of the trailer. This means that the entire structure of FIG. 3 would be inverted so that what constitutes the floor surface as seen in FIG. 3 would be the ceiling surface on the inside of the trailer, the hasp 62 being mounted near the top of the door. As an alternate, when the door 17 is open, the plunger 38 may be manually forced downwardly to its lowermost position, where the top surface 39 is flush with the floor of the trailer and may be releasably latched in that position. The latch may be manually released, or may be arranged to be released by the closing of the door. At that time, in the absence of air pressure on the line 54, the spring 40 moves the locking plunger 38 to its locking position illustrated in FIG. 3.

During the normal trucking operation, the valve 52 is in the position illustrated in FIG. 3, which disconnects the air motor 49 from the air system. Changes in air pressure during the braking operation will not cause operation of the plunger 38. Also, when the trailer is parked and the brakes are maintained in the on position, the pneumatic locking system cannot possibly gradually bleed air from the braking system and thereby alter the operation of the braking system.

The precise constructions herein shown are merely illustrative of the principles of the invention. What is considered new and sought to be secured by Letters Patent is:

I claim:

1. A closed compartment for the transportation of freight at times at least on a highway, said compartment including an opening for the removal of the contents of the compartment and a door for closing said opening, power-controlled door-locking means for locking said door against unauthorized opening, said locking means having a locking position inaccessible for manual release from the outside of said compartment and having an alternate unlocking position, power-coupling means on the outside of the compartment for receiving power for the compartment from an external source, and means establishing a path for power from the coupling means to said locking means, said last means including a switch having a first position interrupting the path for power to the locking means and an alternate noninterrupting position to render the power means effective, and spring means constantly urging the switch to its first position whereby the source of power when connected to the coupling means is ineffective except while the switch is held in its alternate position against the spring bias.

2. A structure according to claim 1 wherein the structure has road wheels for facilitating transportation on a highway and power brakes controlled by power through the coupling means for braking the rolling of the wheels on the highway, said switch when in its first position rendering the lock release unresponsive to power fluctuations caused by operation of the brakes.

3. A structure as defined in claim 1 wherein the switch is a pneumatic switch biased to its first position.

4. A structure as defined in claim 1 wherein there is provided manually operable latching means for releasably holding the door shut independently of said locking means.

5. A structure as defined in claim 2 wherein there is provided manually operable latching means for releasably holding the door shut independently of said locking means.